United States Patent [19]

Lagana et al.

[11] 4,367,258

[45] Jan. 4, 1983

[54] PROCESS FOR THE DECARBONATION OF GASES

[75] Inventors: Vincenzo Lagana, Milan; Francesco Saviano, Segrate; Virginio Cavallanti, Vailate, all of Italy

[73] Assignee: Snamprogetti, S.p.A., Milan, Italy

[21] Appl. No.: 178,826

[22] Filed: Aug. 18, 1980

[30] Foreign Application Priority Data

Nov. 8, 1979 [IT] Italy .............................. 27123 A/79

[51] Int. Cl.³ .............................................. B01D 53/34
[52] U.S. Cl. .................................... 423/228; 423/229; 423/232; 423/233
[58] Field of Search ............... 423/220, 228, 229, 232, 423/233

[56] References Cited

U.S. PATENT DOCUMENTS

| 2,993,750 | 7/1961 | Giammarco | 423/220 |
| 3,275,403 | 9/1966 | Mayland | 423/232 X |
| 3,685,960 | 8/1972 | Benson | 423/232 X |
| 3,773,895 | 11/1973 | Thirkell | 423/232 X |

FOREIGN PATENT DOCUMENTS 870895 6/1961 United Kingdom ................ 423/232

*Primary Examiner*—Earl C. Thomas
*Attorney, Agent, or Firm*—Morgan, Finnegan, Pine, Foley & Lee

[57] ABSTRACT

Decarbonation of gases with solutions of alkali metal carbonates and with alkanolamine solutions is improved by exploiting the heat of the vapors exiting the head of the alkanolamine solution regeneration column and also the heat of fluids condensed at the head of the regeneration column for the alkali metal carbonate solution. A very favorable heat balance is achieved and considerable power savings.

2 Claims, 1 Drawing Figure

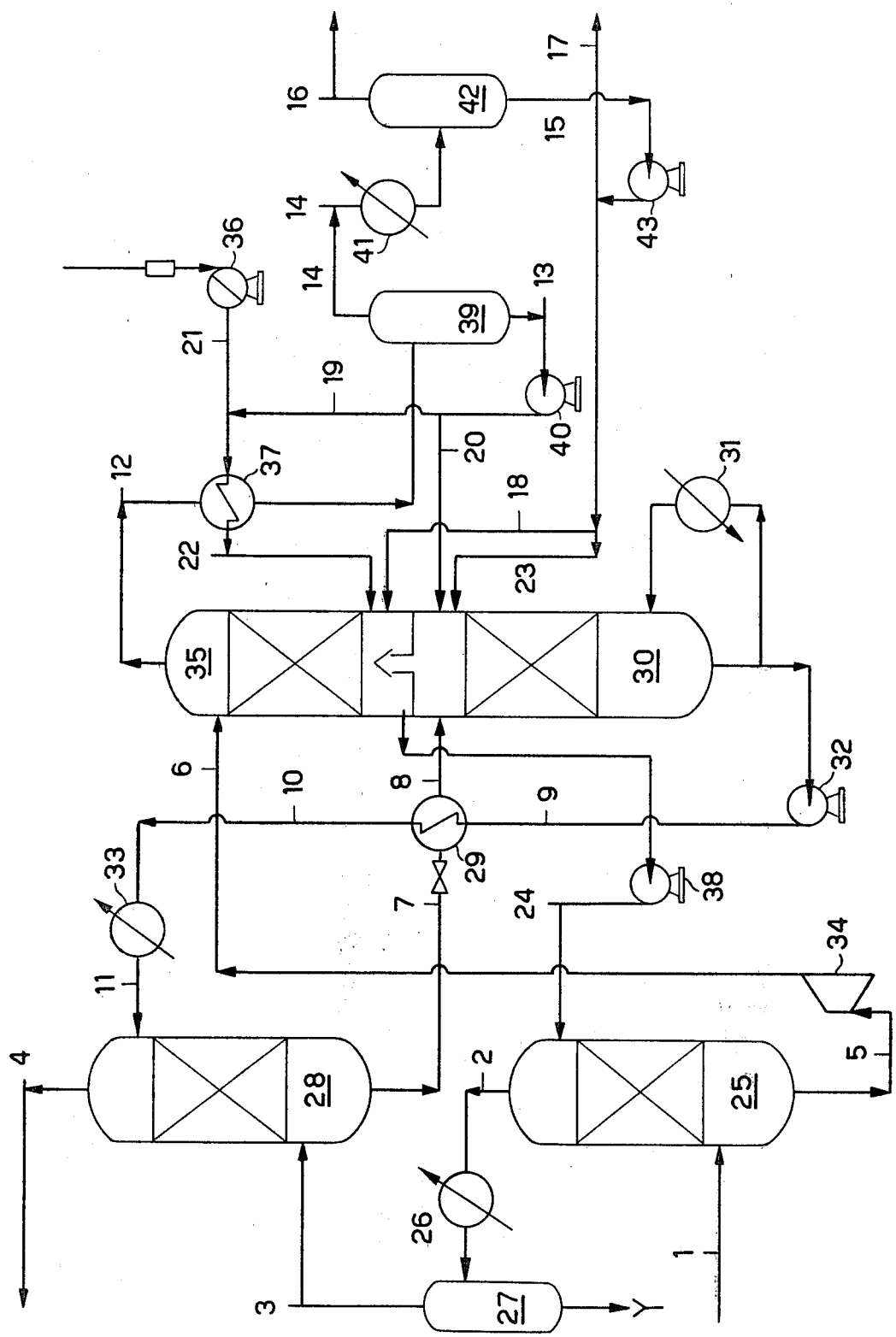

PROCESS FOR THE DECARBONATION OF GASES

This invention relates to a gas-decarbonation process.

Many gas-decarbonation processes are known in the art and the ones which are most widely used nowadays are based on the use of an alkali metal carbonate solution or of an alkanolamine solution.

In the art are also known combined procedures in which there are provided both a decarbonation stage with a solution of alkali metal carbonates and a decarbonation stage with alkanolamine solution.

The combined process is especially advantageous whenever it is desired to reduce the carbon dioxide content in the treated gas down to a few parts per million by volume, by exploiting in the best possible way the different properties of the two absorbing solutions.

The combined process comprises two sequential stages of decarbonation: the first is a washing with a hot solution of alkali metal carbonates, which permits to obtain a gas having about 2% by volume of $CO_2$, and the second stage is a washing with a cold solution of alkanolamines which further reduces the $CO_2$ level in the gas to a few parts per million by volume.

The gas to be decarbonated enters the base of a first pressurized absorbing column, rises in the column in counterflow relationship with a hot solution of alkaline carbonates, exits the column head and enters, upon cooling to 40° C., the base of a second pressurized absorption column which is fed at its top with a solution of alkanolamines, more particularly (mono)ethanolamine.

The spent carbonate and alkanolamine solutions, which are collected at the bottom of the first and the second absorbing columns, respectively, go directly to the respective regenerating columns which are operated under atmospherical pressures, and are then recycled by pumping.

A hydraulic turbine, inserted in the feeding piping for the spent carbonate solution, permits to exploit the pressure differential obtaining between the absorbing and regenerating columns, a part of the power demand of the pumps being thus recovered.

The regeneration of the alkanolamine solution and the carbonate solution (hot) is carried out by administering heat. The combined process is a considerable advance over the methods which exploit a single absorption solution, but it originates, however, running cost problems in connection with the regeneration of the absorption solutions.

Quite surprisingly, it has now been found that the expenditures for regenerating the absorbing solutions can considerably be reduced by properly exploiting the available heat.

An objective of the present invention is to provide a process for decarbonating a gas in two stages of absorption, with alkanolamine solution and alkaline metal carbonate solutions, respectively, wherein the alkanolamine spent solution is sent for its regeneration to a first column, wherein carbon dioxide is stripped by administering heat from an external source, whereas the spent alkali metal carbonate solution is fed for regeneration to a second column in which carbon dioxide is stripped by exploiting the direct heat of the head vapors of said first column plus the heat of a water saturated airstream which has been heated by indirect heat exchange with the fluid which is condensed at the top of the second column, and which is essentially composed by water.

The second column is located, with advantage, above the first column, according to a preferred embodiment of the present invention.

It is a surprising fact that it is possible to exploit, for regenerating the alkali metal carbonate solution, water-saturated air at a temperature which is lower than that required for the regeneration, by exploiting low-temperature heat recovered from the head condenser.

A BRIEF DESCRIPTION OF THE DRAWING

The process of the present invention is illustrated by the single FIGURE constituting the drawing which is a flow diagram of a decarbonation installation made in accordance with the present invention.

Reference is now to be had to the drawing for a more detailed description of the invention.

The gas to be decarbonated, which, in the case in point, is essentially composed by $H_2$ and $N_2$ with the 18.2% of $CO_2$, enters, saturated with water at the temperature of 120° C. and under a pressure of 30 atm at the base of the absorption column 25 through the piping 1 and rises along the column in counterflow relationship with a hot solution of potassium carbonate having a concentration of 25% by wt.

The hot gas exits the head of the column 25 with about 2% by volume of $CO_2$ and reaches, through the piping 2, the cooler 26 wherein it is cooled down to 40° C. and, upon separation of the condensed water at 27, flows through the piping 3 to the bottom of the second absorption column 28.

When rising along the column 28 the gas contacts a solution of DEA (20% by wt) which further reduces the $CO_2$ content of the gas down to a level of about 100 ppm (parts per million). The gas with about 100 ppm of $CO_2$ exits the head of the column 28 and, through the piping 4, is sent to the utilization.

The exhausted DEA solution exiting the bottom of the column 28 passes directly through the piping 7 to the exchanger 29 wherein it is preheated and subsequently, via the piping 8, it reaches the head of the regeneration column 30 which is operated under a pressure slightly above the atmospherical pressure and in the bottom of which it is collected, properly heated and regenerated.

Heating is carried out by administering indirect heat in the form of possibly available steam or hot gases to the reboiler 31.

The regenerated DEA solution is sent to the bottom of the column 30 by the pump 32 and, through the pipe 9, first to the exchanger 29 wherein it is partially cooled, and then, via the piping 10, to the cooler 33 wherein it is further cooled down to 40° C., and, eventually, via the piping 11, to the head of the absorption column 28.

The hot exhausted potassium carbonate solution which has been collected at the bottom of the absorption column 25, is passed through the piping 5 to the hydraulic turbine 34 and, by being expanded therein, permits to obtain a fraction of the power required by the pumps, whereafter it reaches, via the piping 6, the head of the regeneration column 35.

The regeneration of the carbonate solution in the column 35 is carried out adiabatically by using the hot head vapours of the column 30 as well as a stream of saturated hot air.

The air is compressed by the blower 36 and, after having been heated and simultaneously saturated in the head condenser 37 of the column 35, it is sent to the base of the column 35 via the piping 22: it has thus become possible to recover a fraction of the condensation heat of the water contained in the head vapors of the regeneration column 35: on account of the low thermal level of such vapors, it would not have been possible to recover said heat otherwise.

The regenerated carbonate solution from the bottom of the regeneration column 35 is pumped by pump 38 along pipeline 24 to the head of the absorption column 25.

The head vapors of the column 35 arrive, through the piping 12, at the exchanger 37 wherein a fraction of the water contained in said vapors is condensated and collected at 39, drawn through the piping 13 by the pump 40 and sent in part, via the pipe 20, to the head of the column 30, and in part, via the piping 19, to the exchanger 37 together with the air coming from the blower 36 through the piping 21.

The vapors exiting the separator 39 are passed through the piping 14 to the cooler 41, wherein they are cooled down to 50° C. and subsequently they reach the separator for the condensate 42 prior to being discharged in the atmosphere through the pipe 16.

The condensate water collected at 42 is drawn through the pipe 15 by the pump 43 and sent partially through the pipe 17 to the extreme ends of the installation, partly through the pipe 18 to the bottom of the column 35 and the balance through the pipe 23 as a reflux stream to the column 30.

TABLES 1, 2 and 3 to follow will give the data of a practical exemplary embodiment of the invention, reference being had to the accompanying drawing which is a diagrammatical layout of a decarbonation installation.

| POSITION | 1 | | 2 | | 3 | | 4 | |
| --- | --- | --- | --- | --- | --- | --- | --- | --- |
| Type of fluid | Gas + $CO_2$ | | Head 25 | | Head 27 | | Head 28 | |
| Temp. °C. | 120 | | 65 | | 40 | | 40 | |
| Press.atm. | 30 | | 30 | | 30 | | 30 | |
| | Flow rate $Nm^3/h$ | % v. | Flow rate $Nm^3/h$ | % v. | Flow rate $Nm^3/h$ | % v. | Flow rate $Nm^3/h$ | % v. |
| $H_2 + N_2$ | 96589 | 75.06 | 96589 | 97.17 | 96589 | 97.75 | 96589 | 99.75 |
| $CO_2$ | 23411 | 18.19 | 1973 | 1.98 | 1973 | 2.00 | 100 ppm | |
| $H_2O$ | 8684 | 6.75 | 845 | 0.85 | 248 | 0.25 | 243 | 0.25 |
| 20% wt DEA soln. | — | — | — | — | — | — | — | — |
| 25% wt $K_2CO_3$ soln. | — | — | — | — | — | — | — | — |
| TOTAL | 128684 | 100.00 | 99407 | 100.00 | 98810 | 100.00 | 96832 | 100.00 |

| POSITION | 5 | | 6 | | 7 | | 8 | |
| --- | --- | --- | --- | --- | --- | --- | --- | --- |
| Type of fluid | exhausted carbonate | | Exh. carbonate soln. | | Exh. DEA soln. | | Exh. DEA soln. | |
| Temp. °C. | 80 | | 80 | | 56 | | 100 | |
| Press. atm. | 30 | | | | 30 | | 1.4 | |
| | flow rate, wt. kg/hour | Carbon. index | Flow rate, wt kg/hour | Carbon. Index | Flow rate | % wt | Flow rate, wt | % wt |
| $H_2 + N_2$ | — | — | — | — | — | — | — | — |
| $CO_2$ | — | — | — | — | 3876 | 3.76 | 3876 | 3.76 |
| $H_2O$ | — | — | — | — | — | — | — | — |
| 20% wt DEA soln. | — | — | — | — | 99285 | 96.24 | 99285 | 96.24 |
| 25% wt $K_2CO_3$ soln. | 1.223.410 | 1.90 | 1.223.410 | 1.90 | — | — | — | — |
| TOTAL | 1.223.410 | 1.90 | 1.223.410 | 1.90 | 103161 | 100.00 | 103161 | 100.00 |

| POSITION | 9 | | 10 | | 11 | | 12 | |
| --- | --- | --- | --- | --- | --- | --- | --- | --- |
| Type of fluid | Regen. DEA soln. | | Regen. DEA soln. | | Regen. DEA soln. | | Head 35 | |
| Temp. °C. | 119 | | 73 | | 40 | | 75 | |
| Press. atm. | | | | | 30 | | | |
| | weight Flow rate, kg/h | wt % | weight Flow rate kg/h | wt % | weight Flow rate kg/h | wt % | volume Flow rate $Nm^3/h$ | vol. % |
| Air | — | — | — | — | — | — | 47000 | 40.51 |
| $CO_2$ | — | — | — | — | — | — | 23411 | 20.18 |
| $H_2O$ | — | — | — | — | — | — | 45606 | 39.31 |
| 20% wt. DEA soln. | 99281 | 100 | 99281 | 100 | 99281 | 100 | — | — |
| 25% wt. $K_2CO_3$ soln. | — | — | — | — | — | — | — | — |
| TOTAL | 99281 | 100 | 99281 | 100 | 99281 | 100 | 116017 | 100.00 |

| POSITION | 13 | | 14 | | 15 | | 16 | |
| --- | --- | --- | --- | --- | --- | --- | --- | --- |
| Type of fluid | Condensates | | Head 39 | | Condensates | | Head 42 | |
| Temp. °C. | 73 | | 73 | | 50 | | 50 | |
| Press. atm. | | | | | | | | |
| | weight Flow rate kg/h | wt % | volume Flow rate $Nm^3h$ | vol % | weight Flow rate kg/h | wt % | atmospherical vol. flow rate $Nm^3/h$ | vol. % |
| Air | — | — | 47000 | 45.71 | — | — | 47000 | 60.64 |
| $CO_2$ | — | — | 23411 | 22.77 | — | — | 23411 | 30.20 |
| $H_2O$ | 10600 | 100 | 32415 | 31.52 | 20344 | 100 | 7098 | 9.16 |
| 20% wt DEA soln. | — | — | — | — | — | — | — | — |
| 25% wt $K_2CO_3$ soln. | — | — | — | — | — | — | — | — |
| TOTAL | 10600 | 100 | 102826 | 100.00 | 20344 | 100 | 77509 | 100.00 |

| POSITION | 17 | 18 | 19 | 20 |
| --- | --- | --- | --- | --- |
| Type of fluid | Condensates | Condensates | Condensates | Condensates |
| Temp. °C. | 50 | 50 | 73 | 73 |
| Press. atm. | | | | 1.4 |
| | weight | weight | weight | weight |

-continued

|  | Flow rate kg/h | wt % | Flow rate kg/h | wt % | Flow rate kg/h | wt % | Flow rate kg/h | wt % |
|---|---|---|---|---|---|---|---|---|
| Air | — | — | — | — | — | — | — | — |
| $CO_2$ | — | — | — | — | — | — | — | — |
| $H_2O$ | 2161 | 100 | 3527 | 100 | 9230 | 100 | 1370 | 100 |
| 20% wt DEA soln. | — | — | — | — | — | — | — | — |
| 25% wt $K_2CO_3$ soln. | — | — | — | — | — | — | — | — |
| TOTAL | 2161 | 100 | 3527 | 100 | 9230 | 100 | 1370 | 100 |

| POSITION | 21 | 22 | 23 | 24 |
|---|---|---|---|---|
| Type of fluid | Air | Air | Condensates | Regen. carbonate soln. |
| Temp. °C. | 35 | 65 | 50 | 65 |
| Press. atm. |  |  | 1.4 | 30 |

|  | volume Flow rate $Nm^3/h$ | vol % | volume Flow rate $Nm^3/h$ | vol % | weight Flow rate kg/h | wt % | weight Flow rate kg/h | Carbonatic index |
|---|---|---|---|---|---|---|---|---|
| Air | 47000 | 96.03 | 47000 | 77.78 | — | — | — | — |
| $CO_2$ | — | — | — | — | — | — | — | — |
| $H_2O$ | 1944 | 3.97 | 13430 | 22.22 | 14656 | 100 | — | — |
| 20% wt DEA soln. | — | — | — | — | — | — | — | — |
| 25% wt $K_2CO_3$ | — | — | — | — | — | — | 1.175.000 | 1.45 |
| TOTAL | 48944 | 100 | 60430 | 100 | 14656 | 100 | 1.175.000 | 1.45 |

We claim:

1. In a process for the decarbonation of gases wherein the gaseous mixture to be treated is passed through a first absorption zone in contact with an absorbent solution to effect a partial decarbonation of the gases thereof, the treated gaseous mixture is thereafter passed through a second absorption zone in contact with another absorbent solution to effect a further decarbonation of the gases and the spent solutions from the two absorption zones are thereafter passed to two regeneration zones to effect a regeneration of such solutions, the improvement comprising using an alkali metal carbonate solution in the first absorption zone and an alkanolamine solution in the second absorption zone and regenerating the two spent solutions by the steps comprising passing the spent alkanolamine solution to a first regeneration zone heated by an external heat means to effect a regeneration thereof, passing the spent alkali metal solution to a second regeneration zone, the heating of said second regeneration zone being achieved by the direct heat of the head vapors of the first regeneration zone and the heat of a water-saturated stream heated by indirect heat exchange with the fluid condensed at the head of the second regeneration zone, and collecting the respective regenerated solutions.

2. A process as claimed in claim 1, wherein the regeneration of the alkali metal cabonate solution is carried out in a column which is in superimposed location relationship relative to the regeneration column for the alkanolamine solution.

* * * * *